US008638373B2

(12) United States Patent
Niikura

(10) Patent No.: US 8,638,373 B2
(45) Date of Patent: Jan. 28, 2014

(54) IMAGING DEVICE THAT RESETS AN EXPOSURE BY FEEDBACK CONTROL, METHOD FOR CONTROLLING IMAGING DEVICE AND PROGRAM PRODUCT

(75) Inventor: Kentarou Niikura, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 409 days.

(21) Appl. No.: 12/912,318

(22) Filed: Oct. 26, 2010

(65) Prior Publication Data

US 2011/0096192 A1  Apr. 28, 2011

(30) Foreign Application Priority Data

Oct. 27, 2009  (JP) ................. 2009-246378

(51) Int. Cl.
*H04N 5/243* (2006.01)
*G03B 7/083* (2006.01)

(52) U.S. Cl.
USPC .............. 348/229.1; 348/221.1; 348/230.1

(58) Field of Classification Search
None
See application file for complete search history.

(56) References Cited

U.S. PATENT DOCUMENTS 6,184,933 B1 *  2/2001  Ogura ........................ 348/364
6,628,328 B1 *  9/2003  Yokouchi et al. ......... 348/221.1

7,292,275 B2 * 11/2007 Masuyama .................... 348/297
7,386,228 B2 *  6/2008 Okada ............................ 396/238
7,787,026 B1 *  8/2010 Flory et al. ................ 348/231.99
2002/0041761 A1 *  4/2002 Glotzbach et al. ............ 396/429
2003/0086005 A1 *  5/2003 Nakamura .................... 348/223.1
2005/0157203 A1 *  7/2005 Nakakuki et al. ............. 348/362
2008/0043133 A1 *  2/2008 Sasaki et al. .................. 348/341

FOREIGN PATENT DOCUMENTS

| JP | 2000-078461 A | 3/2000 |
| JP | 2004-363658 A | 12/2004 |
| JP | 2006-154642 A | 6/2006 |
| JP | 2008-193278 A | 8/2008 |

OTHER PUBLICATIONS

Japanese Office Action issued Jul. 23, 2013 in corresponding Japanese Patent Application No. 2009-246378.

* cited by examiner

*Primary Examiner* — James Hannett
*Assistant Examiner* — Dwight C Tejano
(74) *Attorney, Agent, or Firm* — Sughrue Mion, PLLC

(57) ABSTRACT

An imaging device includes an imaging element which obtains an image, and an imaging sensor processing unit which resets an exposure of the imaging element by a feedback control based on an image data obtained by the imaging element. The imaging sensor processing unit continuously executes, by pipeline processing, the following processing of setting an exposure time of the imaging element in a first frame just after start-up of the imaging device, making the imaging element accumulate light with an exposure time set at a former frame in a second frame, and outputting the image data by applying a gain set by the second frame in a third frame.

19 Claims, 10 Drawing Sheets

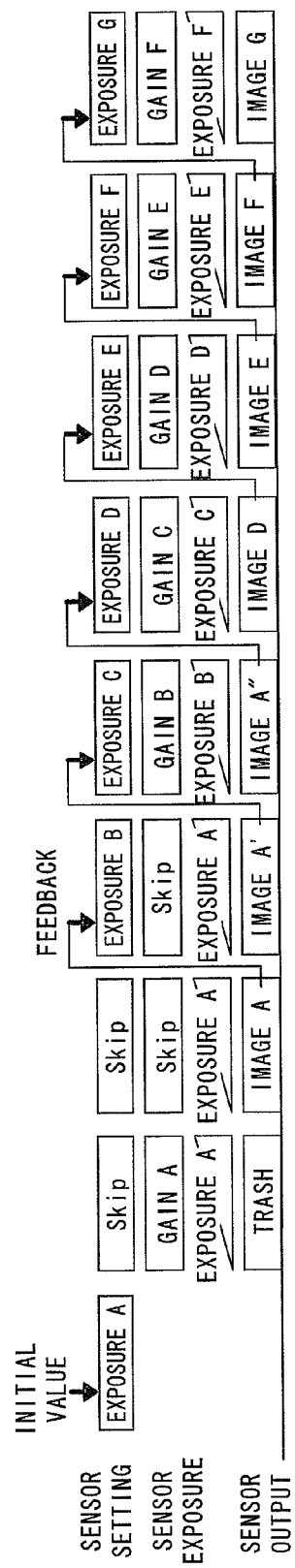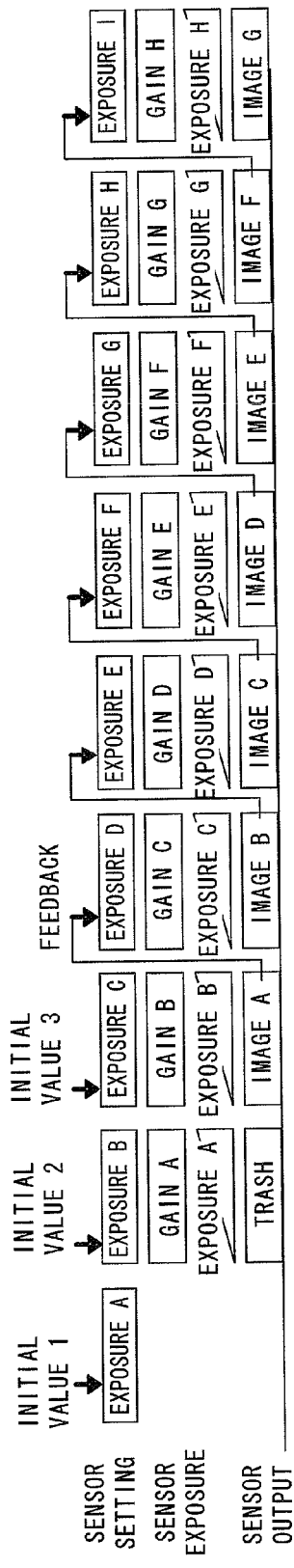

IMAGING DEVICE THAT RESETS AN EXPOSURE BY FEEDBACK CONTROL, METHOD FOR CONTROLLING IMAGING DEVICE AND PROGRAM PRODUCT

INCORPORATION BY REFERENCE

This application is based upon and claims the benefit of priority from Japanese patent application No. 2009-246378, filed on Oct. 27, 2009, the disclosure of which is incorporated herein in its entirety by reference.

BACKGROUND

1. Field of the Invention

The present invention relates to an imaging device such as a digital camera, a method for controlling an imaging device and a program product, and particularly to an imaging device, a method for controlling an imaging device and a program product which can perform auto exposure control.

2. Description of Related Art

In general, when an exposure control of a CCD (Charge Coupled Device) or a CMOS (Complementary Metal Oxide Semiconductor) is performed, it is necessary to control both of "an exposure time (shutter speed)" and "a gain" in sets (for example, Japanese Unexamined Patent Application Publication No. 2000-78461). It is important that these two control information are controlled with different timings with respect to one image data. In a normal exposure control, "an exposure time" is required to be determined and set first. Then two separate processing including a first stage processing and a second stage processing are executed. In the first stage processing, a light receiving element stores charge in response to incident light according to the exposure time that is determined and outputs the cumulative charge (luminance). In the second stage processing, an exposure is controlled by gain (sensitizing) (post-processing) which compensates for deficiency to get an appropriate exposure with respect to this output. That is, an appropriate exposure is obtained by "incident light×exposure time×gain". To achieve this in a digital camera, it is necessary that three steps which are "setting exposure time", "exposure (light accumulation)", and "gain (sensitizing)" are performed in series. These processing cannot be conducted in parallel with respect to one image data.

Therefore, when there is no information of exterior (incident light) in advance, for example, when a camera is booted up or scenes are greatly changed, the following processing is necessary to set an appropriate exposure value according to the situation of the exterior. Firstly, appropriate "exposure time" and "gain" are set, an obtained image data (luminance of an image=incident light×exposure time×gain) is evaluated, and the evaluated result is fed back to the next exposure time and gain. An appropriate exposure cannot be obtained without execution of these processing. To perform these processing, it is necessary to evaluate an extensive image (whole image) which is obtained by the first stage. The image data is accumulated once, and after finishing the evaluation, a gain processing needs to be performed on the whole image again. This leads to an increasing circuit size and a delaying processing time and there is a problem that it takes a long time to stabilize control exposure of a camera.

By the way, in Japanese Unexamined Patent Application Publication No. 2006-154642, an exposure control is performed based on a feedback by fill light of a passive AF (passive automatic focus) at the time of start-up. However, a camera which does not mount a special device which can measure lightness by floodlight and light-receiving such as a passive AF in a side of camera cannot be applied. Although some expensive digital camera may mount the device, it is often difficult to mount the device in a system for a mobile phone and so on due to problems such as a price, a size, and an electrical power.

SUMMARY

As for the setting of exposure, the following technique is publicly known. In Japanese Unexamined Patent Application Publication No. 2004-363658, an exposure time of an imaging device is controlled with a long-time shutter at a first time and with a short-time shutter at a second time immediately after power activation. Then luminance average value at each shutter operation is calculated by a luminance average value calculation means. Based on the calculated value, an imaging element driving means controls a shutter time control signal so as to become a luminance average value which is a convergence target of exposure control by the luminance average value calculation means, and controls a shutter time of the imaging device. By this, even if an output of the imaging device is saturated, the time which is required to the exposure control can be shortened because appropriate exposure control is performed from third shutter time.

However, no matter how the exposure time is changed, it is inevitable that the whole image may be "white-out" or "black-out" depending on the circumstances. If these situations are occurred, a white balance also cannot be evaluated, as well as estimation of accurate exposure time. Further, since a feedback from the next several frames has to be waited, there is a problem that stability of an exposure and white balance gets delayed.

Not only patent document 3 but also most of the patent documents related to the exposure control do not consider the control timing of the control target (sensor).

A first exemplary aspect of the present invention is an imaging device including an imaging element which obtains an image, and an imaging sensor processing unit which resets an exposure of the imaging element by a feedback control based on an image data obtained by the imaging element. The imaging sensor processing unit continuously executes, by pipeline processing, the following processing of setting an exposure time of the imaging element in a first frame just after start-up of the imaging device, making the imaging element accumulate light with an exposure time set at a former frame in a second frame, and outputting the image data by applying a gain set by the second frame in a third frame.

A second exemplary aspect of the present invention is a method for controlling an imaging device which resets an exposure of an imaging element by a feedback control based on an image data obtained by the imaging element. The method includes continuously executing, by pipeline processing, before the feedback control, the following processing of setting an exposure time of the imaging element in a first frame just after start-up of the imaging device, making the imaging element accumulate light with an exposure time set at a former frame in a second frame, and outputting the image data by applying a gain set by the second frame in a third frame, and sequentially evaluating an image data obtained continuously in the third frame and subsequent frames, and determining an optimal exposure based on the evaluation result and setting the optimal exposure to the imaging element.

According to the present invention, the imaging device continuously executes, by pipeline processing the following processing of setting the exposure time of the imaging element in a first frame just after start-up of the imaging device, making the imaging element accumulate light with an exposure time set at a former frame in a second frame, and outputting the image data by applying a gain set by the second frame in a third frame. By this, the imaging device continuously obtains an image data without waiting for the feedback control. Then, by performing exposure control using a plurality of image data continuously obtained, the exposure control can be stabilized faster in accordance with an initial value.

According to the invention, an imaging device and control method of an imaging device which can improve a stability performance of exposure control of the imaging device such as a digital camera can be provided.

BRIEF DESCRIPTION OF THE DRAWINGS

The above and other exemplary aspects, advantages and features will be more apparent from the following description of certain exemplary embodiments taken in conjunction with the accompanying drawings, in which:

FIG. 5A is a view to explain exposure setting timing according to a related art;

FIG. 5B is a view to explain exposure setting timing of the first exemplary embodiment of the present invention;

DETAILED DESCRIPTION OF THE EXEMPLARY EMBODIMENTS

Hereinafter, specific embodiments of the present invention will be described in detail with reference to the drawings. This exemplary embodiment applies the present invention into a digital camera including an imaging device such as CCD or CMOS.

First Exemplary Embodiment

Figure 1:
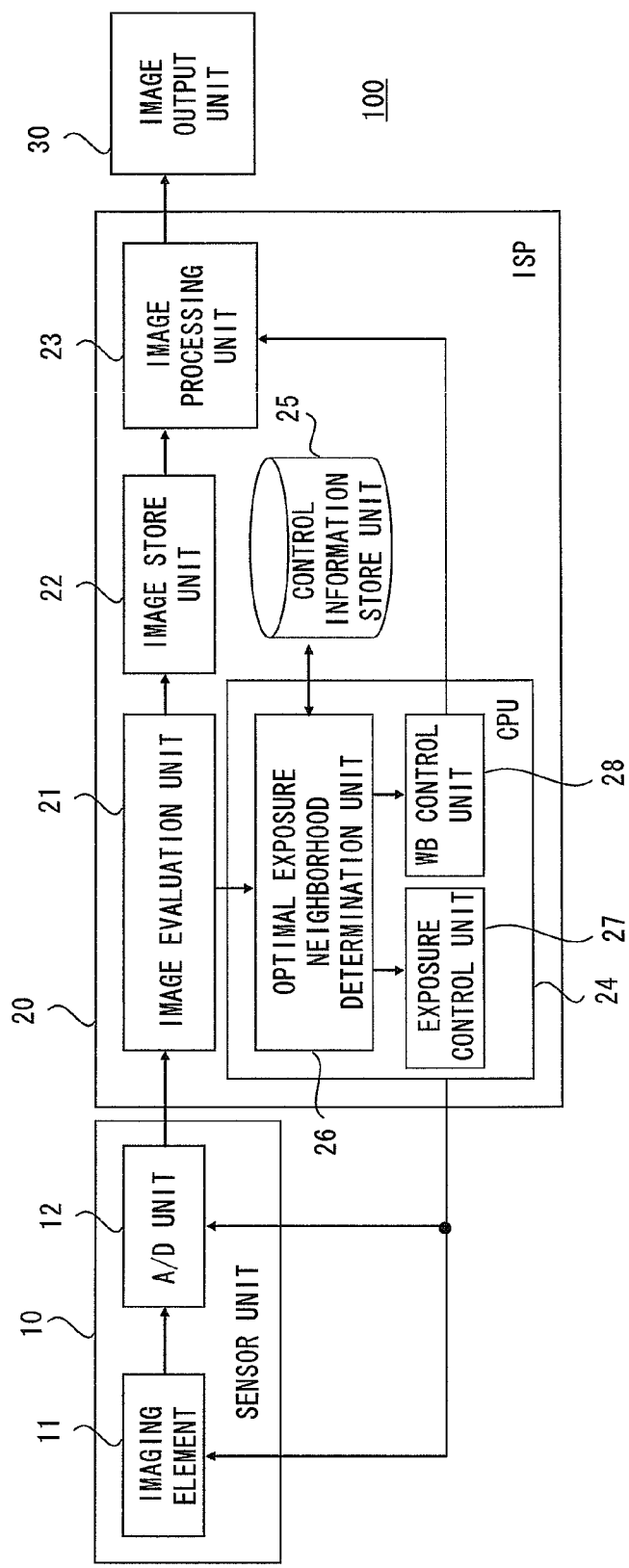
FIG. 1 is a view showing an imaging device of a first exemplary embodiment of the present invention.

FIG. 1 is a view showing an imaging device of the first exemplary embodiment. An imaging device 100 includes an imaging sensor unit 10, an imaging sensor processing unit 20 (hereinafter referred to as "ISP" (Image Sensor Processor)), and an image output unit 30.

The imaging sensor unit 10 includes CCD or CMOS and so on, and further includes an imaging element 11 which obtains an image, and an analog-digital converter (A/D unit) 12 which converts an image obtained by the imaging element 11 from an analog signal into a digital signal. The ISP 20 includes an image evaluation unit 21, an image store unit 22, an image processing unit 23, a CPU 24, and a control information store unit 25, and the CPU 24 includes an optimal exposure neighborhood determination unit 26, an exposure control unit 27, and a white balance control unit (WB control unit) 28.

The image evaluation unit 21 calculates a luminance value of an image data obtained by the imaging element 11. The CPU 24 calculates an optimal exposure value (aperture value (F-number) and shutter speed (exposure time)) and gain based on the calculation result of the image evaluation unit 21 and sets them into the imaging element 11 and the A/D unit 12. The imaging element 11 obtains an image with the set exposure time. The A/D unit 12 amplifiers an image data obtained by the imaging element 11 with the set gain.

The image data whose luminance value is calculated by the image evaluation unit 21 is temporarily stored in the image store unit 22, and is outputted to the image processing unit 23. The image processing unit 23 receives an optimal white balance from the CPU 24, and processes the image data so as to achieve the white balance, then the image data is outputted into the image output unit 30.

Here, the imaging device 100 of the present exemplary embodiment has a feature that the imaging device 100 continuously executes, by pipeline processing without feedback control, the following processing of setting an exposure time of the imaging element in a first frame just after start-up of the imaging device, taking an image with the set exposure time in a second frame, and applying the gain set by the second frame into the capture image in a third frame. According to the present exemplary embodiment, pipeline processing is performed in three frames in a row. That is, in the first to the third frames, different exposure values and gains are set; in the second to the fourth frames, an image is obtained with each exposure time; in the third to the fifth frames, an image data is obtained. The image evaluation unit 21 calculates an evaluation value of the image data obtained in the third to the fifth frames, and the exposure control unit 27 determines an optimal exposure based on the evaluation result of the image data obtained in the third to the fifth frames and sets the optimal exposure to the imaging element 11.

Therefore, the control information store unit 25 has exposure control information (initial values for an exposure) for an exposure set in the first to third frames after start-up. Further, the control information store unit 25 has exposure and WB control information such as information which is needed for an exposure control setting and a WB setting which are set in the next frame (WB setting value at the time when an appropriate exposure cannot be obtained).

In this way, by obtaining an image by using three initial values for the exposure just after start-up, and calculating an optimal exposure value according to this result, the exposure control can be stabilized with faster speed than conventional techniques.

First, the exposure control and white balance control will be briefly explained. Note that, as will be discussed later, since the present exemplary embodiment is characterized by a timing that an image is obtained just after start-up and exposure value and white balance are determined, a method of determining the exposure value and white balance from the obtained image is not limited to the method which is explained below.

Figure 2:
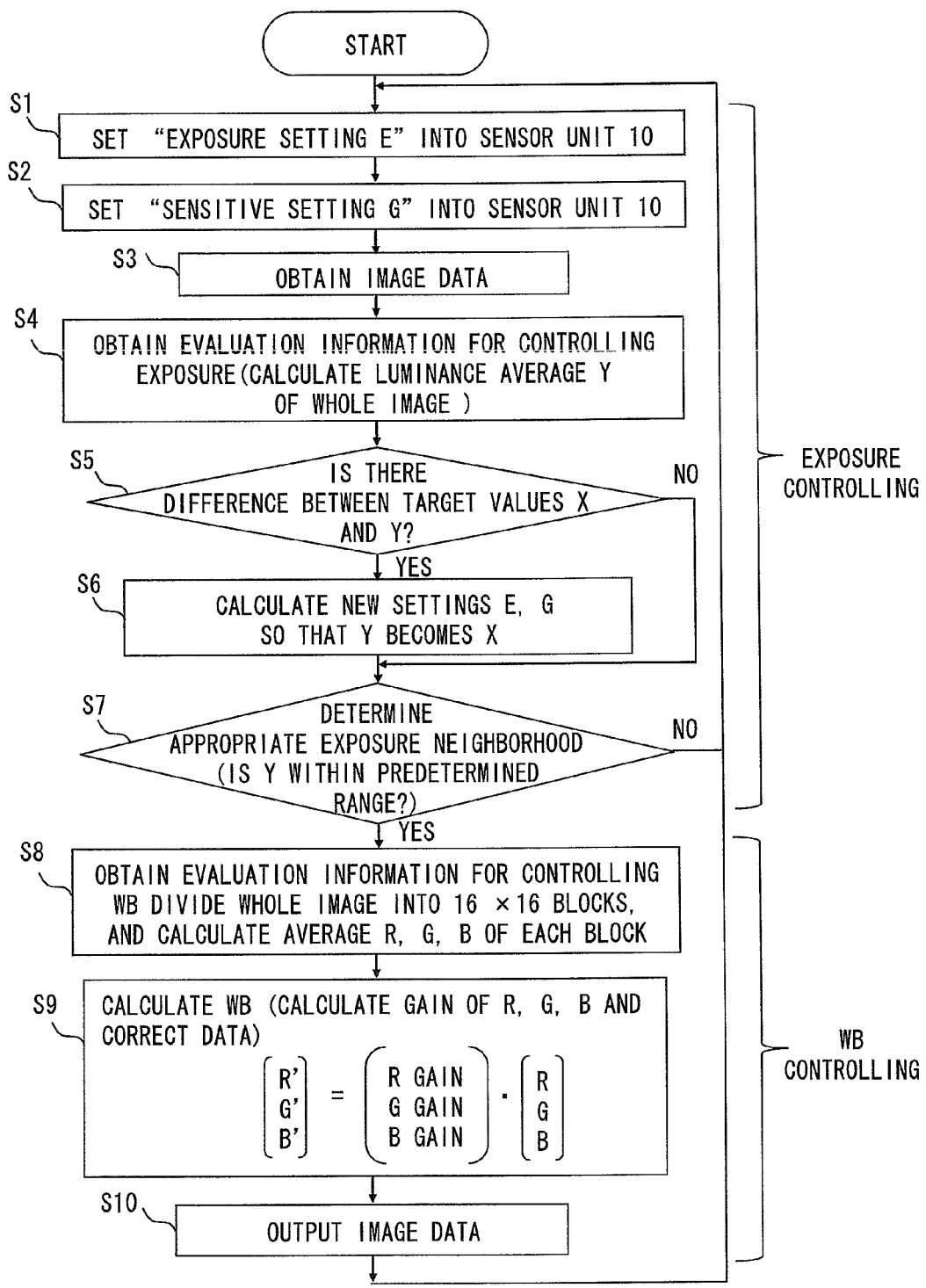
FIG. 2 is a flow chart showing a typical method to perform exposure and white balance control based on an obtained image.
Figure 3A:
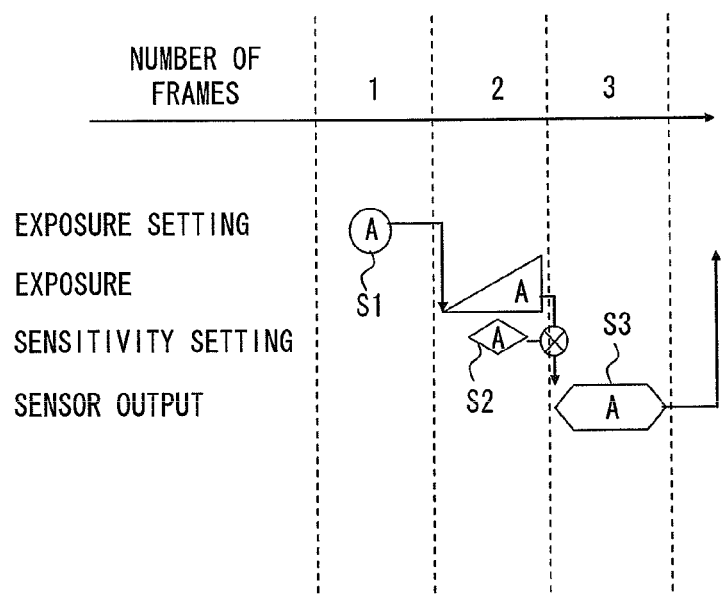
FIG. 3A is a view showing a method for a exposure setting.

FIG. 2 is a flow chart showing a typical method to perform exposure and white balance control based on an obtained image. FIGS. 3A to 3D are views to explain an exposure and white balance control operation of the image evaluation unit 21 and FIG. 3A is a view to explain the timing. Here, the processing of the ISP 20, especially the processing of the CPU 24 and the image processing unit 23 will be explained.

At first, exposure control will be explained. The exposure value and gain are set to the imaging element 11 and the A/D unit 12 of the imaging sensor unit 10 respectively by the exposure control unit 27 (step S1). As shown in FIG. 3, for example, this operation is performed in the first frame. In the next frame (in this example, the second frame), the exposure is performed by the imaging element 11. In this term, the exposure control unit 27 performs a sensitive setting (gain setting) G into the A/D unit 12 (step S2). Also, in this term, other blocks of the ISP 20 wait till the next frame.

Figure 3B:
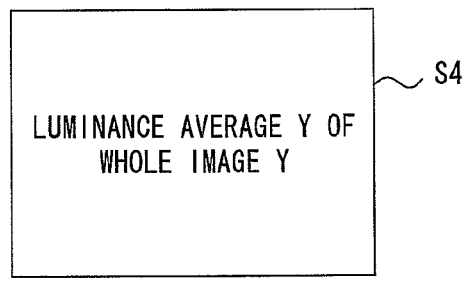
FIG. 3B is a view showing luminance average values of the whole image.

Next, an image data after setting exposure in the first frame is obtained in the third frame (step S3). The obtained image data is amplified by the A/D unit 12 and is input to the image evaluation unit 21. Next, the image evaluation unit 21 calculates an average of luminance of the image data (step S4). For example, as shown in FIG. 3D, one image data is divided into 16×16 blocks. Then, the average of luminance value (luminance average) of each block is calculated. Either luminance of YUV format or RGB can be used to calculate the luminance value. First, after calculating luminance average of each block, weighting, in which the weight of the center part of a block is enlarged than that of an outer edge part is performed as needed. Last, average Y of luminance of the whole image is calculated from the luminance value of each block as shown in FIG. 3B.

Figure 3C:
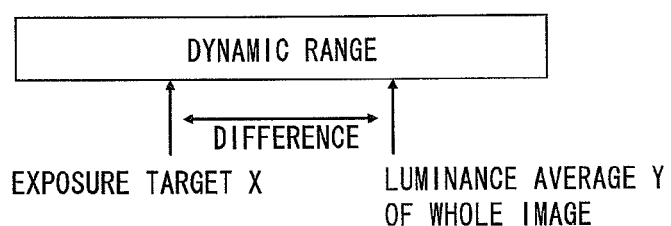
FIG. 3C is a view to explain dynamic range.
Figure 3D:
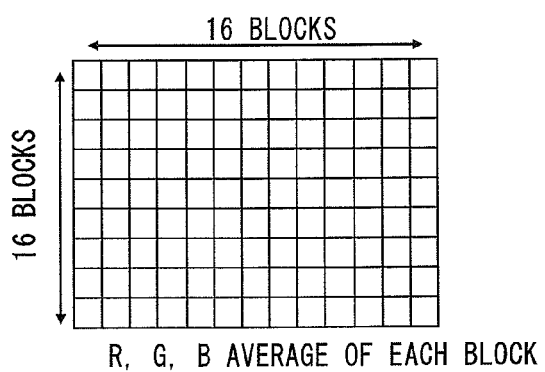
FIG. 3D is a view showing an average of R, G, B of each block.

Next, as shown in FIG. 3C, in a dynamic range of the imaging element 11, the optimal exposure neighborhood determination unit 26 determines how far the average Y of luminance of the whole image is away from an exposure target value X (step S5).

If the difference between the exposure target value X and the luminance average Y is equal to or more than a predetermined value, a correction of exposure is performed. Thus, the exposure control unit 27 calculates exposure setting E' and sensitive setting G' so that the luminance average Y is the exposure target value X (step S6). Note that, if the difference is small, the exposure value is assumed to be appropriate, and the step S6 is skipped. The correction of exposure is calculated, for example, with the current exposure setting E and the sensitive setting G.

$$(E'-G')=(E-G)\times X/Y$$

Note that, although there are many E' and G' which meets the above expression, the ISP 20 determines how to distribute E' and G' in accordance with the scene and so on. If the above expression is met, luminance (exposure) of the obtained image is the same. The processing of steps S4 to S6 is executed in the third frame, In this correction, when the obtained luminance average Y is twice the value of the target value X, a feedback control, for example the exposure time is reduced to half, is performed.

The optimal exposure neighborhood determination unit 26 evaluates the luminance average Y (step S7). That is, the optimal exposure neighborhood determination unit 26 determines whether or not the luminance average Y of this luminance value is included in the predetermined range such as 1% to 80% in the dynamic range. Here, if the luminance average Y is in the predetermined range, the optimal exposure neighborhood determination unit 26 determines white balance control can be performed, then moves to the white balance control. Here, if the difference is out of the predetermined range, the white balance control is not performed, and the processing from step S1 in which exposure and gain are set to the imaging sensor unit 10 is again performed.

Next, the white balance control will be explained. First, the WB control unit 28 obtains evaluation information of the white balance control (step S8). Specifically, for example, the image evaluation unit 21 divides the image data into 16×16 blocks, calculates the average of R, G, and B for each block, and outputs them to the WB control unit 28. The WB control unit 28 calculates gain which is multiplied by each value of R, G, and B in order to correct tone (step S9). Note that, because there are a variety of calculation methods of this gain, a variety of techniques is well known, and this is not a feature of the present invention, the detailed calculation method is omitted. The WB control unit 28 outputs obtained R gain, G gain, and B gain into the image processing unit 23, and the image processing unit 23 corrects the tone of the image data. Last, the correction data is output from the image output unit 30 (step S10).

Figure 4A:
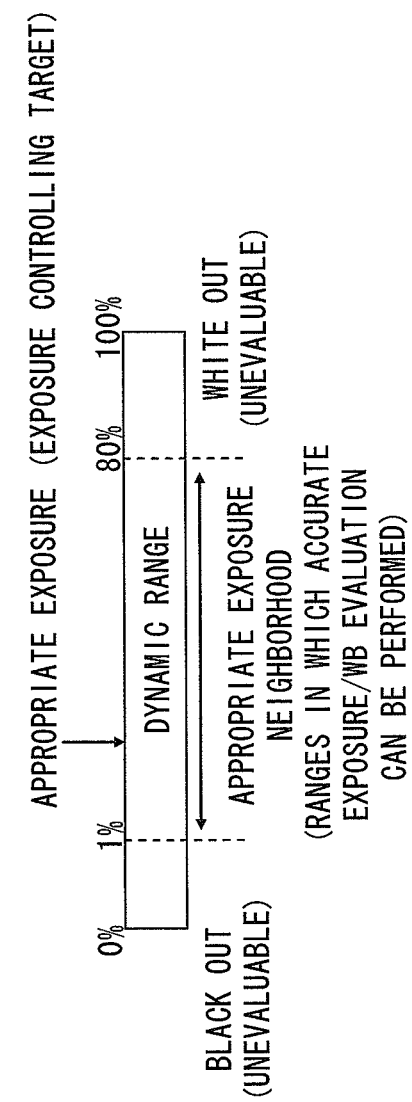
FIG. 4A is a view to explain an optimal exposure neighborhood.
Figure 4B:
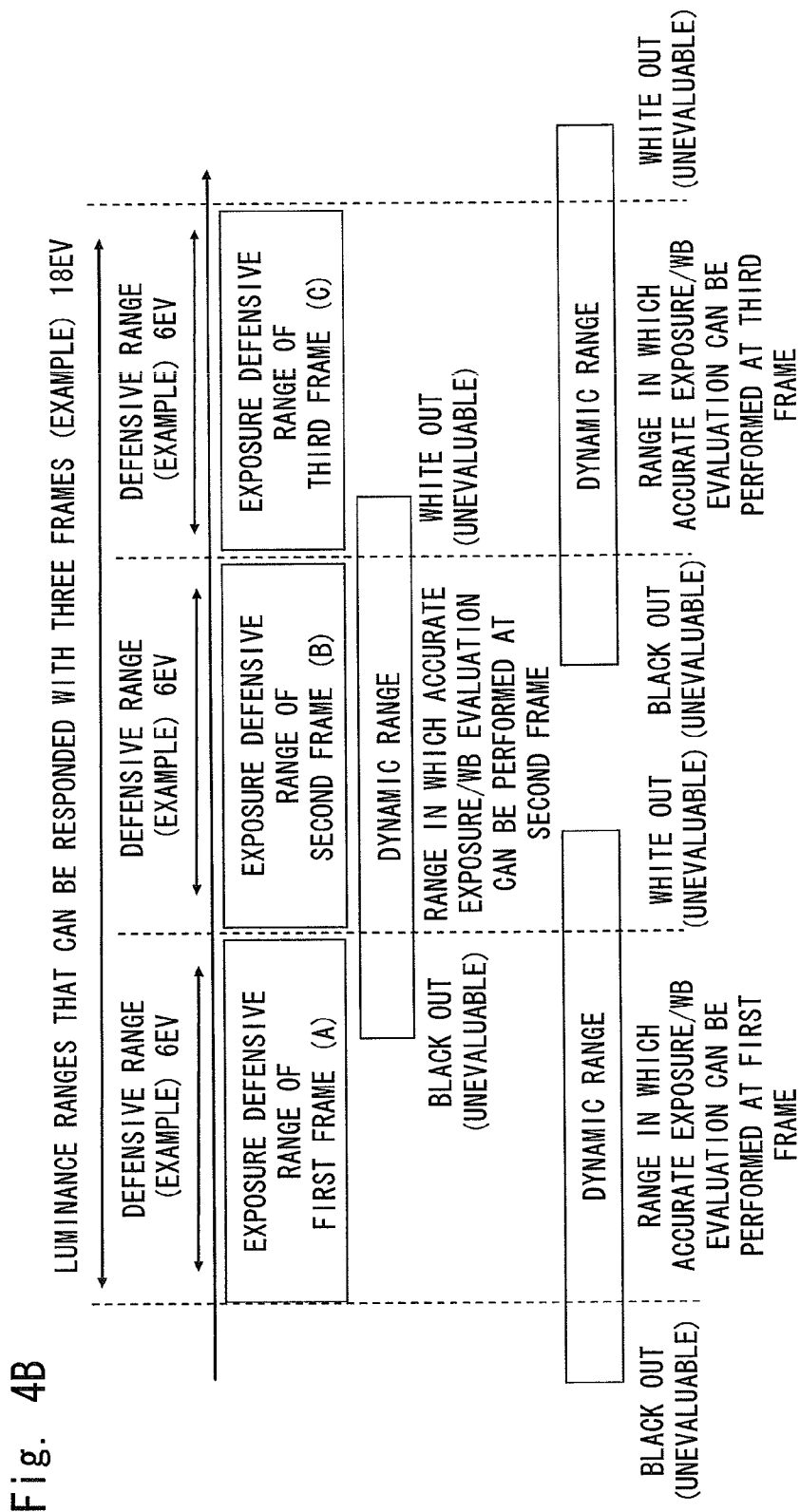
FIG. 4B is a view to explain an initial value of the first exemplary embodiment of the present invention.

Next, the initial values of the exposure which are set by the exposure control unit 27 will be explained. As described above, in the present exemplary embodiment, three initial values for the exposure are stored in the control information store unit 25, and these values are continuously set in the first to the third frames. FIGS. 4A and 4B are views to explain the initial values. As shown in FIG. 4A, if the dynamic range of the camera is assumed to be 0% to 100%, the optimal exposure neighborhood is assumed to be 1% to 80%, for example. The optimal exposure neighborhood is a range which can perform correct exposure and white balance control. Naturally the exposure control target value X is in this range. If a value is out of this range, that is, if the luminance average Y becomes smaller than 1% of the dynamic range, the black-out is occurred and the optimal exposure neighborhood determination unit 26 cannot evaluate the luminance average Y. If the luminance average Y becomes greater than 80% of the dynamic range, the white-out is occurred and evaluation becomes impossible. Here, this optimal exposure neighborhood range is referred to as a defensive range.

For example, in common digital cameras, this defensive range is about the size of 6 EV (Exposure Value). Therefore, if the exposure is set so that these defensive ranges do not overlap with each other, the brightness of 18 EV can be covered with three initial values. That is, by setting exposure of each three frame to the initial values in the ranges that the defensive ranges do not overlap, it is possible to respond to the brightness of the range of 18 EV. Then, after start-up of the camera, the exposure of 18 EV brightness and the white balance control can be executed by obtaining the image by using these initial values. Note that, in the case that one frame is 6 EV and three frames are 18 EV, for example, a part of each defensive range can be overlapped. That is, by overlapping a part of the dynamic range in the image obtained with each exposure, the predetermined brightness ranges can be covered.

FIG. 5B is a view showing an exposure setting timing of the present exemplary embodiment. FIG. 5A is a view showing a conventional timing. In conventional techniques, if an exposure A is set (sensor setting) at the first frame, the image can be obtained in the third frame. Then, based on the image data obtained at the third frame, a feedback control has been performed. In this case, a calculation for the feedback control is performed at the fourth frame, and the feedback is actually reflected from the fifth frame. That is, the period during the second and third frames are the waiting time of acquisition of the image data, and are wasting time.

On the other hand, as shown in FIG. 5B, in the present exemplary embodiment, the exposure A, the exposure B, and the exposure C are set at the first frame, the second frame, and the third frame, respectively. These values are, as described above, initial values for the exposure which are set so as not to overlap the defensive ranges of each other. The image for three frames can be obtained in third to the fifth frames. As described above, the images for three frames can respond to the circumstance of the brightness of a wide range which has 18 EV, and in most cases, their appropriate exposures are included in this 18 EV. Therefore, at the latest, the exposure can be stabilized in the seventh frame or subsequent frames.

Further, if the initial value is one as in the conventional technique, when the exposure A is outside of the appropriate exposure neighborhood, the next image of the exposure D is obtained at the sixth frame, then the exposure stabilization control gets more delayed than the present exemplary embodiment. Furthermore, the exposures D, E, and F which are set at the fourth to sixth frames are the feedback result of the image data obtained by the exposures A, B, and C. On the other hand, in the conventional technique, the exposures B, C, and D which are set at the fourth to sixth frames can all perform feedback control only from the image data obtained from the exposure A. Also from this point, the method for the exposure controlling of the present exemplary embodiment can stabilize the exposure faster, thereby obtaining more accurate exposure value.

Figure 6:
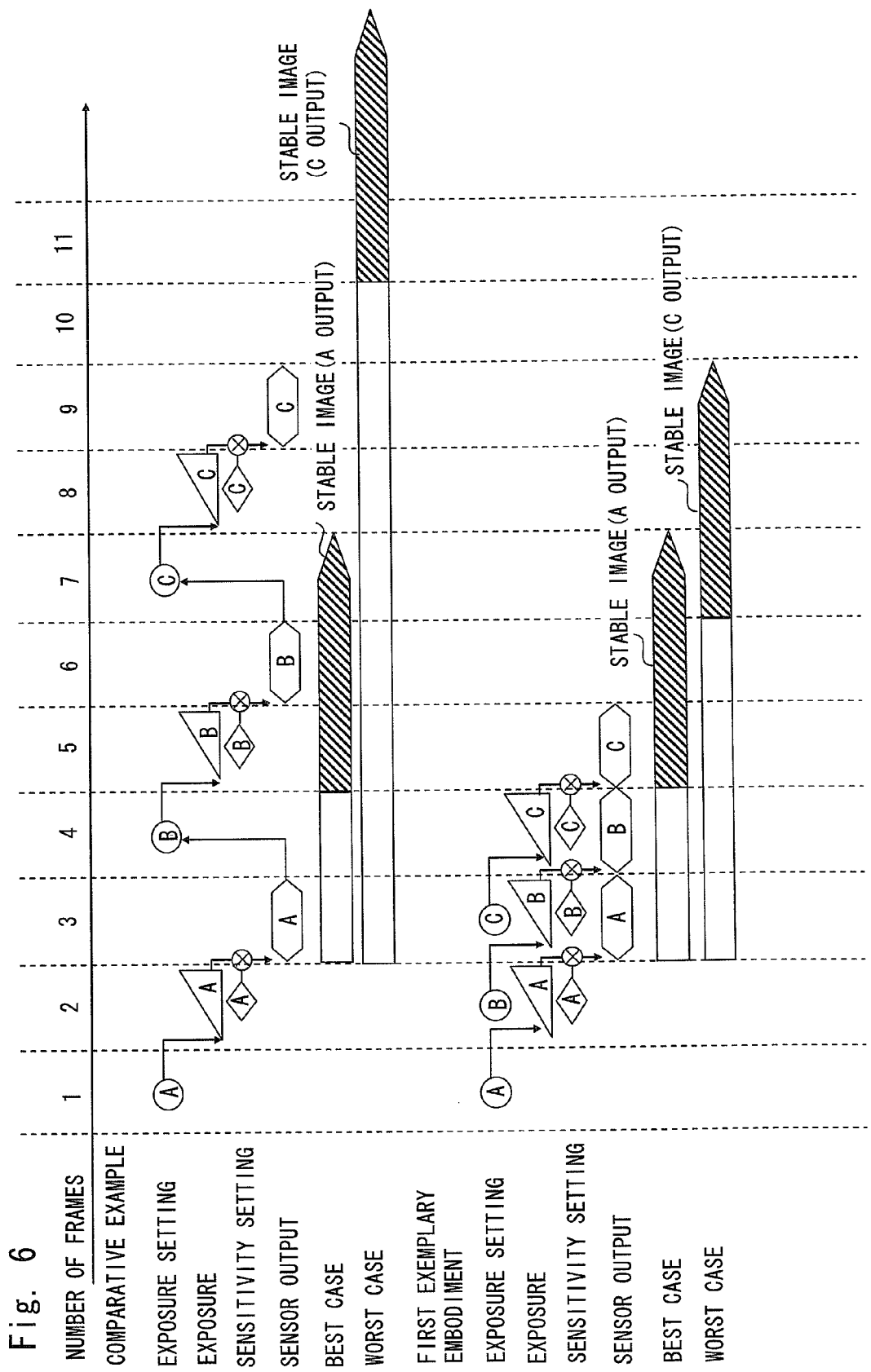
FIG. 6 is a view showing an effect of the first exemplary embodiment of the present invention.

FIG. 6 is a view showing the effect of the present exemplary embodiment. For comparison, the case of using the conventional technique is also shown (hereinafter referred to as "comparative example"). As shown in FIG. 6, in a comparative example, if the exposure A is set at the first frame, and the exposure A is within the appropriate exposure neighborhood, an output in the fifth frame and the subsequent frames will be stabilized. This is assumed to be the best case. Note that, here, although a time of one frame is required for a white balance control, this time may be different depending on a method for controlling the white balance. In a comparison of this best case, in the worst case, that is, if the white-out and black-out are occurred in the exposure A, the exposure B set in the fourth frame is not within the appropriate exposure neighborhood, and a stabilized image is obtained with the exposure C set in the seventh frame, the stabilized output is obtained in the eleventh frame or subsequent frames. This is assumed to be the worst case.

In contrast, in the present exemplary embodiment, in the best case, the stabilized output can be obtained in the fifth frame like the comparative example. On the other hand, in the worst case, as the image of the exposure C can be obtained in the fifth frame, the stabilized output can be obtained in the seventh frame or subsequent frames. Note that, if the exposure A is within the appropriate exposure neighborhood, other image data of the exposures B and C may be discarded. Here, the length of one frame is about 33.3 ms to ¼ s. Therefore, in the worst case, the present exemplary embodiment can stabilize the exposure faster by four frames (133 sm to 1 s).

As above, in the present exemplary embodiment, a plurality of initial values for the exposure setting is continuously set without waiting for the feedback after start-up of the imaging device, and the processing from the exposure setting till the image acquisition is executed in parallel. Thus the optimal solution of the exposure according to the exterior can be obtained with faster speed without waiting for the feedback. This enables the exposure control at start-up of the imaging device 100 to be stabilized with faster speed. By shortening a start-up time to stabilize the exposure by this, usability can be improved.

In the imaging device such as a digital camera, it is necessary for the imaging sensor unit 10 to set the exposure time two frames before obtaining the image and to set a signal amplification gain before one frame before it because of its structure. Therefore, to obtain one image, total three frames which are for setting exposure time, setting a gain and outputting the image are needed. In the exposure controlling of the imaging device 100, the image data which is obtained from this result is analyzed, and the exposure time and signal amplification gain are controlled by using the analyzed information as a feedback. Therefore, the controlling is required so as to achieve an optimal exposure or to stabilize the exposure with repeating three frames as one set. Thus, in the conventional techniques, in the circumstance which has no information of exterior such as especially start-up time, quite a long time is needed before stabilizing the controlling and achieving the optimal exposure.

On the other hand, in the present exemplary embodiment, by using a time at the start-up which is normally a waiting time for a feedback, and switching and setting a plurality of initial values for the exposure (in the present exemplary embodiment, three-step values) forcibly with ignoring the feedback, a target of the exposure controlling (exposure controlling target value) can be found fast and accurately, and appropriate exposure information can be obtained.

For the initial values for the exposure of three-step, three values with which the appropriate exposure neighborhood ranges (defensive ranges) are set not to overlap with each other are used. By setting the exposure continuously in three frames from the first frame by these initial values for the exposure, the imaging device can respond to the brightness of 18 EV and the exposure controlling can be stabilized accurately and with faster speed.

Second Exemplary Embodiment

Next, a second exemplary embodiment will be explained. In the above first exemplary embodiment, three initial values for the exposure with which the defensive ranges are set not to overlap each other are used. On the other hand, in the present exemplary embodiment, a setting sequence of three initial values for the exposure is specified. This can stabilize the white balance controlling with faster speed. The constitution of the imaging device 100 is the same as that in the first exemplary embodiment shown in FIG. 1.

Figure 7:
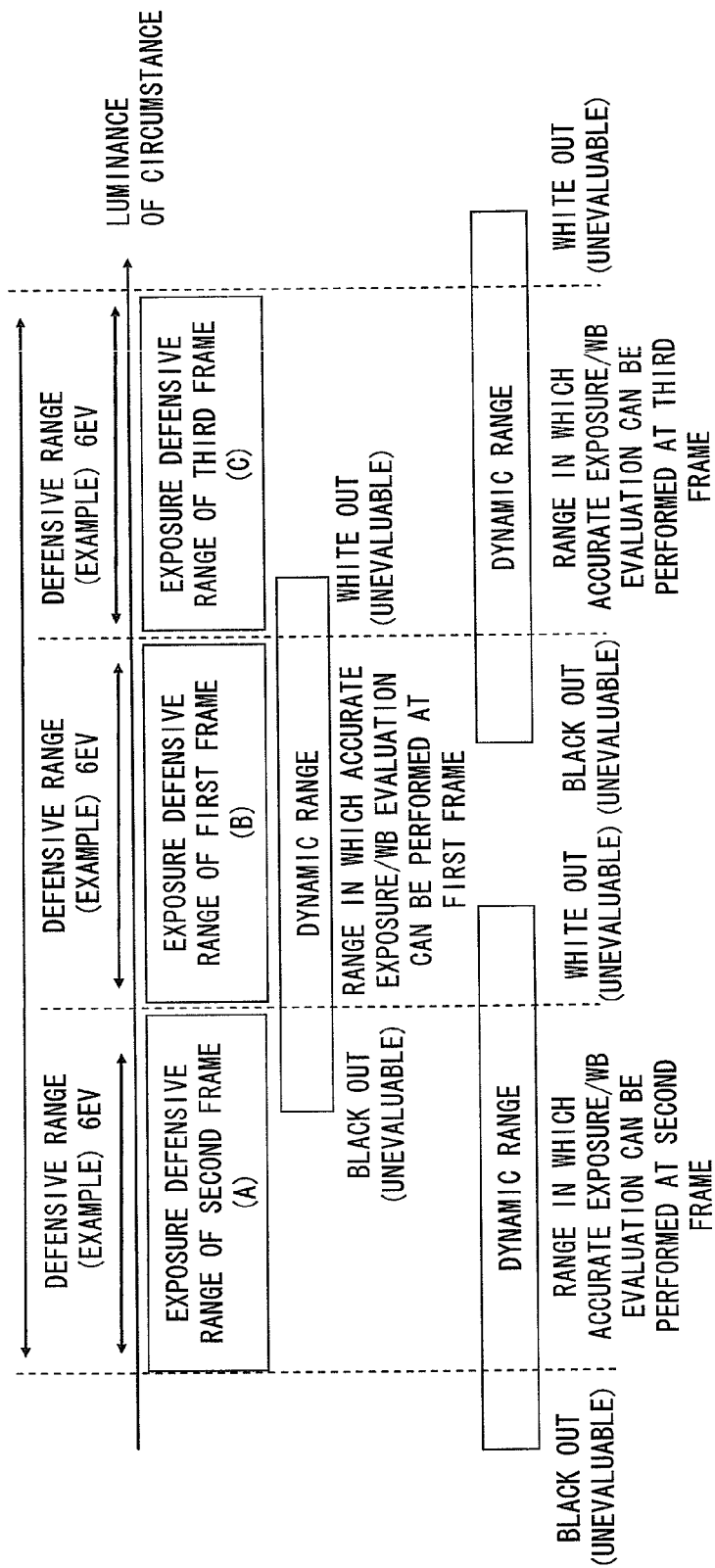
FIG. 7 is a view to explain an initial value for an exposure of a second exemplary embodiment of the present invention.

FIG. 7 is a view to explain the initial values for the exposure of the present exemplary embodiment. In the first exemplary embodiment, although the initial values for the exposures with which the defensive ranges are set not to overlap each other are used, the sequence is not specified. On the other hand, in the present exemplary embodiment, an initial value for the exposure set in the first frame (a first initial value) is a setting value which can obtain an image of a brightness which can determine an indoor site or an outdoor site. An initial value for the exposure set in the second frame (a second initial value) is a setting value which can obtain an image of a brightness which assumes the indoor site. An initial value for the exposure set in the third frame (a third initial value) is a setting value which can obtain an image of a brightness which assumes the outdoor site. In the following description, the initial values for the exposure shown in FIG. 7 are explained as an exposure A (the second initial value), an exposure B (the first value) and an exposure C (the third value) in ascending order.

Figure 8:
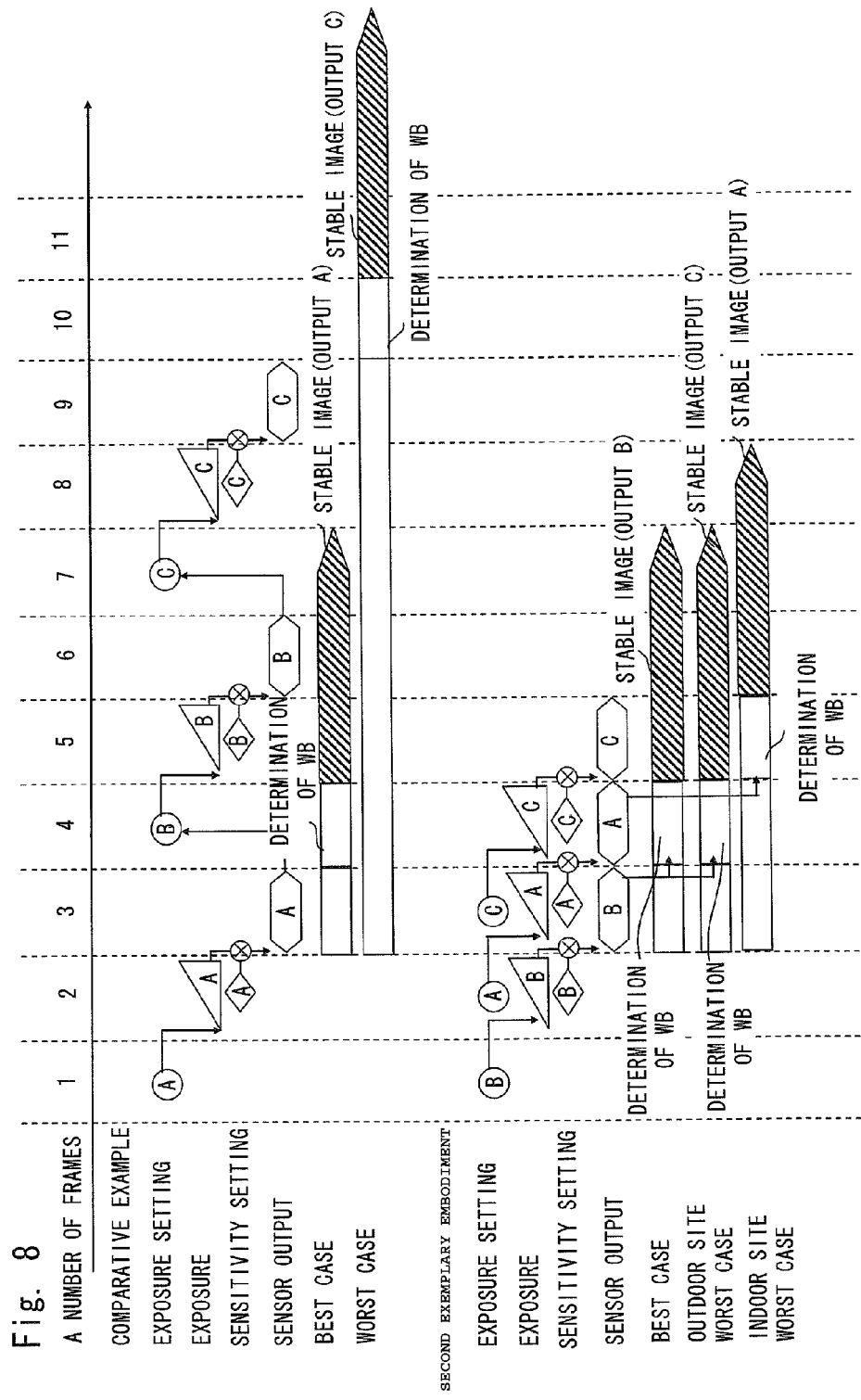
FIG. 8 is a view showing an effect of the second exemplary embodiment of the present invention.

Next, before explaining an effect in which the initial values for the exposure are specified with such a sequence, an effect which is compared with the conventional techniques will be explained first. FIG. 8 is a view showing the effect of the present exemplary embodiment. As in the first exemplary embodiment, in the conventional technique, in the worst case, the exposure and white balance are stabilized in the eleventh frame or subsequent frames. On the other hand, it is the sixth frame in the worst case of the present exemplary embodiment, and, the exposure and the white balance can be stabilized in the sixth frame and subsequent frames. First, it is determined whether a current circumstance is an indoor site or an outdoor site from an image data obtained by the exposure B. Here, if it is determined to be the outdoor site, a luminous source in the current circumstance can be substantially specified to sunlight. That is, when the image data obtained by the exposure B is white-out, a luminous source is substantially specified to sunlight. Therefore, the white balance can be estimated without evaluation, and the value is stored in the control information store unit 25 preliminary, and this value can be used. Thus, the processing of calculating the white balance is not needed. Therefore, although an image data by the exposure C which is the outdoor site is obtained in the fifth frame, since there is the white balance (each gain of R, G, and B), the image data from the imaging sensor unit 10 is obtained and the white balance is controlled and the image can be outputted at the same time in the fifth frame (the outdoor worst case).

Further, when the exposure B of the first frame is within the appropriate exposure neighborhood, the image data of the exposure B is obtained in the third frame, the white balance is calculated in the fourth frame, and as in the conventional technique, the stabilized output can be obtained in the fifth frame (the best case).

Next, when the current circumstance is in the indoor site, the white balance is calculated from the image data obtained by the exposure A. That is, the exposure A is set at the second frame, the exposure is performed at is the third frame, the image data is obtained at the fourth frame, the white balance is calculated at the fifth frame, and the exposure and the white balance are stabilized at the sixth frame (the indoor worst case).

In this way, in the present exemplary embodiment, the exposure and the white balance are stabilized five frames faster than the conventional technique in the worst case. That is, if one frame is assumed to be 33.3 ms, they are stabilized faster than the conventional technique by about 166.5 ms.

Figure 9:
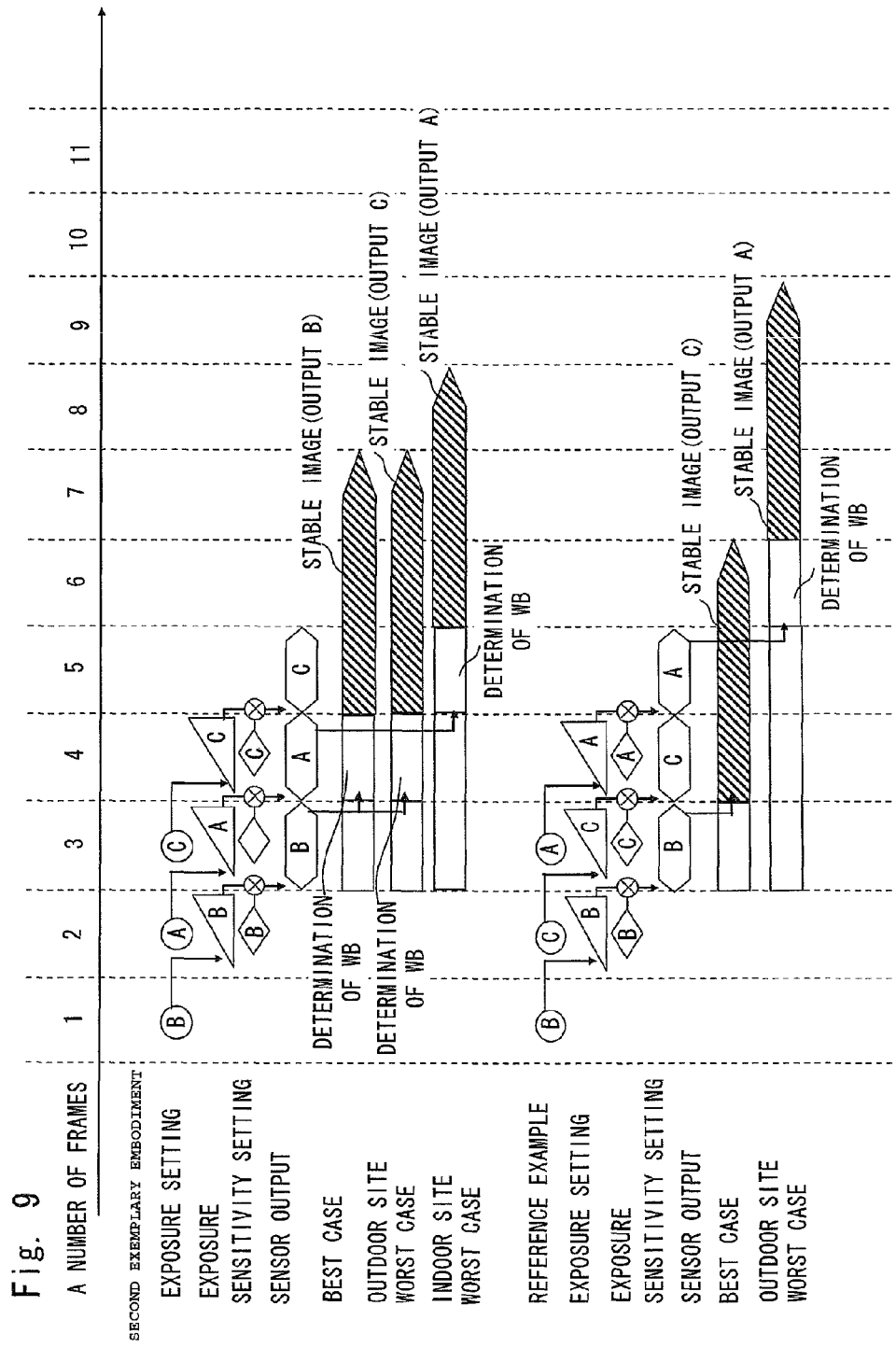
FIG. 9 is a view to explain an effect which is occurred by difference of a sequence of the initial value for the exposure of the second exemplary embodiment of the present invention.

Next, the effect of the sequence of the initial values for the exposure of the present exemplary embodiment will be explained. FIG. 9 is a view to explain the effect which is obtained from the difference of the sequence of the initial values for the exposure. As described above, in the first exemplary embodiment, the sequence of the initial values for the exposure is not particularly limited. Therefore, for example, the effect will be explained in comparison to the case in which the exposure sequence is set to the exposures B, C, and A in this order (hereinafter referred to as "a reference example"). As shown in FIG. 9, in the reference example, the exposure B is set at the first frame, and it is determined whether it is the indoor site or the outdoor. Here, the best case is when the current circumstance is the outdoor site.

As described above, if it is determined to be the outdoor site, the white balance is a specified value, and thus the processing which makes the white balance appropriate value is not needed. The exposure which corresponds to the brightness of the outdoor site is the exposure C, and as it is set at the second frame, the image data can be obtained at the fourth frame. As it is possible to correct the image data with the RGB gain for the white balance at the same when the image data is obtained, the image can be output at the fourth frame.

Next, if it is determined to be more indoor site than the image data of the exposure B, the white balance controlling is required. This controlling is performed after obtaining the image data. Therefore, the exposure which corresponds to the luminance of the indoor site is the exposure A. Since the image is obtained at the fifth frame, the white balance processing can be performed and the image data can be output at the seventh frame (the indoor site worst case). Therefore, if it is set to the sequence of the reference example, in the worst case, the controlling for the exposure and white balance is delayed by one frame than that of the second exemplary embodiment.

Note that, the sequence of the initial values for exposure can be set in other ways than the reference example depending on the purpose of the user. In this case, if it is the outdoor site, the exposure and white balance can be stabilized one frame faster than the present exemplary embodiment.

The first and second exemplary embodiments can be combined as desirable by one of ordinary skill in the art.

While the invention has been described in terms of several exemplary embodiments, those skilled in the art will recognize that the invention can be practiced with various modifications within the spirit and scope of the appended claims and the invention is not limited to the examples described above.

Further, the scope of the claims is not limited by the exemplary embodiments described above.

Furthermore, it is noted that, Applicant's intent is to encompass equivalents of all claim elements, even if amended later during prosecution.

For example, in the above exemplary embodiment, the data receiving device is explained as hardware. However, an arbitrary processing can be achieved by executing a program by CPU (Central Processing Unit). The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

What is claimed is:

1. An imaging device comprising:
    an imaging element which obtains an image; and
    an imaging sensor processing unit which resets an exposure of the imaging element by a feedback control based on an image data obtained by the imaging element, the image sensor processing unit comprising:
    an image evaluation unit which calculates data for evaluation of the image data obtained by the imaging element; and
    an exposure controller which sets an exposure of the imaging element based on a plurality of initial values before obtaining the image data and based on the data for evaluation of the image evaluation unit after obtaining the image data,
    wherein the imaging sensor processing unit continuously executes, by pipeline processing, the following processing of setting an exposure time of the imaging element in a first frame just after start-up of the imaging device, making the imaging element accumulate light with an exposure time set at a former frame in a second frame, and outputting the image data by applying a gain set by the second frame in a third frame, and wherein the image evaluation unit sequentially calculates the data for evaluation of the image data obtained in the third frame and subsequent frames, and the exposure controller determines an optimal exposure based on the data for evaluation obtained in the third frame and subsequent frames and sets the optimal exposure to the imaging device.

2. The imaging device according to claim 1, wherein the imaging sensor processing unit continuously executes the pipeline processing of up to three frames without feedback control.

3. The imaging device according to claim 1, wherein each of the plurality of initial values is the value with which an image of brightness of a predetermined range near appropriate exposure can be obtained.

4. The imaging device according to claim 3, wherein the plurality of initial values includes first to third initial values, and predetermined ranges near appropriate exposure based on each of the plurality of initial values are set to be continuous.

5. The imaging device according to claim 3, wherein the plurality of initial values includes first to third initial values, and at least a part of predetermined ranges near appropriate exposure based on each of the plurality of initial values is set to overlap.

6. The imaging device according to claim 3, wherein the predetermined ranges near appropriate exposure ranges that are dynamic.

7. The imaging device according to claim 4, wherein the first initial value is set to obtain an image of brightness that can determine whether the image is being captured at the indoor site or the outdoor site.

8. The imaging device according to claim 7, wherein the second initial value is set to obtain an image of brightness assuming that the image is being captured at the indoor site, and the third initial value is set to obtain an image of brightness assuming that the image is being captured at the outdoor site.

9. The imaging device according to claim 8, wherein the imaging sensor processing unit comprises a WB controller that determines a white balance, wherein the WB controller determines the indoor site or the outdoor site based on the image data obtained at the third frame, and sets the white balance based on the determination result.

10. The imaging device according to claim 9, wherein the imaging sensor processing unit outputs an image set to the third initial value in the third frame and obtained at a fifth frame as an output image, when the imaging sensor processing unit determines that a current circumstance is the outdoor site based on the image set to the first initial value and obtained first.

11. The imaging device according to claim 9, wherein the imaging sensor processing unit performs a white balance controlling by the WB controller to an image set to the second initial value in the second frame and obtained at a fourth frame, when the imaging sensor processing unit determines that a current circumstance is the indoor site based on the image set to the first initial value and obtained first, and outputs the image as an output image.

12. A method for controlling an imaging device which resets an exposure of an imaging element by a feedback control based on an image data obtained by the imaging element, the method comprising:

continuously executing, by pipeline processing, before the feedback control, the following processing of setting an exposure time of the imaging element in a first frame just after start-up of the imaging device, making the imaging element accumulate light with an exposure time set at a former frame in a second frame, and outputting the image data by applying a gain set by the second frame in a third frame; and sequentially evaluating an image data obtained continuously in the third frame and subsequent frames, and determining an optimal exposure based on the evaluation result and setting the optimal exposure to the imaging element, wherein the determination of an optimal exposure is made by setting an exposure of the imaging element based on a plurality of initial values before obtaining the image data and based on the evaluation result after obtaining the image data.

13. The method for controlling the imaging device according to claim 12, wherein the pipeline processing of up to three frames is executed before the feedback control.

14. The method for controlling the imaging device according to claim 13, wherein each of the plurality of initial values is the value with which an image of brightness of a predetermined range near appropriate exposure can be obtained.

15. The method for controlling the imaging device according to claim 14, wherein the plurality of initial values includes first to third initial values, and predetermined ranges near appropriate exposure based on each of the plurality of initial values are set to be continuous and not to overlap.

16. The method for controlling the imaging device according to claim 14, wherein the predetermined ranges near appropriate exposure are dynamic ranges.

17. The method for controlling the imaging device according to claim 14, wherein the first initial value is set to obtain an image of brightness that can determine an indoor site or an outdoor site.

18. The method for controlling the imaging device according to claim 17, wherein the second initial value is set to obtain an image of brightness assuming the indoor site, and the third initial value is set to obtain an image of brightness assuming the outdoor site.

19. The method for controlling the imaging device according to claim 12, further comprising:

determining the indoor site or the outdoor site based on the image data obtained at the third frame, and setting the white balance based on the determination result.

* * * * *